(12) United States Patent
Markakis et al.

(10) Patent No.: US 6,742,120 B1
(45) Date of Patent: May 25, 2004

(54) SYSTEM AND METHOD FOR CONTROLLING ACCESS TO COMPUTER CODE IN AN IC CARD

(75) Inventors: Dimitrios Markakis, London (GB); Barry Hochfield, Glasgow (GB); John Beric, London (GB); David Anthony Roberts, Warrington (GB)

(73) Assignee: Mondex International Limited, London (GB)

(*) Notice: Subject to any disclaimer, the term of this patent is extended or adjusted under 35 U.S.C. 154(b) by 0 days.

(21) Appl. No.: 09/212,105

(22) Filed: Dec. 15, 1998

Related U.S. Application Data

(60) Provisional application No. 60/073,566, filed on Feb. 3, 1998.

(51) Int. Cl.$^7$ .......................... H04L 9/00; G06F 11/30; H04N 7/167
(52) U.S. Cl. .................. 713/184; 713/200; 380/201
(58) Field of Search .................. 713/184; 380/21, 380/23, 200–202

(56) References Cited

U.S. PATENT DOCUMENTS

| | | | |
|---|---|---|---|
| 4,214,230 A | 7/1980 | Fak et al. | 235/380 |
| 4,218,582 A | 8/1980 | Hellman et al. | 380/30 |
| 4,259,720 A | 3/1981 | Campbell | 705/71 |
| 4,302,810 A | 11/1981 | Bouricius et al. | 705/71 |
| 4,305,059 A | 12/1981 | Benton | 705/43 |
| 4,321,672 A | 3/1982 | Braun et al. | 705/42 |
| 4,341,951 A | 7/1982 | Benton | 705/41 |
| 4,405,829 A | 9/1983 | Rivest et al. | 380/30 |
| 4,408,203 A | 10/1983 | Campbell | 705/71 |
| 4,423,287 A | 12/1983 | Zeidler | 705/71 |
| 4,442,345 A | 4/1984 | Mollier et al. | 235/380 |
| 4,453,074 A | 6/1984 | Weinstein | 705/66 |
| 4,467,139 A | 8/1984 | Mollier | 713/181 |

(List continued on next page.)

FOREIGN PATENT DOCUMENTS

| | | | |
|---|---|---|---|
| EP | 0152024 | 8/1985 | |
| EP | 0157303 | 10/1985 | |
| EP | 0190733 | 8/1986 | |
| EP | 0218176 | 4/1987 | G06F/3/00 |
| EP | 0261030 | 3/1988 | |
| EP | 0275510 | 7/1988 | |
| EP | 0292248 | 11/1988 | G06F/9/445 |
| EP | 0325506 | 1/1989 | |
| EP | 0328289 | 8/1989 | |
| EP | 0354793 | 2/1990 | |
| EP | 0451936 | 10/1991 | G06K/19/073 |
| EP | 0466969 | 1/1992 | |
| EP | 0475837 | 3/1992 | G06K/19/073 |

(List continued on next page.)

OTHER PUBLICATIONS

Davies et al., "Security for Computer Networks: An Introduction to Data Security in Teleprocessing and Electronic Funds Transfer," John Wiley & Sons 1984.

*Primary Examiner*—Gilberto Barrón
*Assistant Examiner*—Kambiz Zand
(74) *Attorney, Agent, or Firm*—Baker Botts L.L.P.

(57) ABSTRACT

In a multiple application card system including an IC card comprising a microprocessor, a read-only memory, a random access memory and an electronically erasable programmable read only memory, a system for controlling access to one or more sets of programming instructions embedded in said read-only memory comprising means for storing on said IC card for at least one application loaded onto said card at least one access flag having a value indicating whether or not access by the at least one application to the at least one set of programming instructions shall be granted and means dependent on said value for allowing access to one or more sets of programming instructions.

6 Claims, 5 Drawing Sheets

U.S. PATENT DOCUMENTS

| | | | |
|---|---|---|---|
| 4,498,000 A | 2/1985 | Decavele et al. | 235/380 |
| 4,536,647 A | 8/1985 | Atalla et al. | 705/70 |
| 4,578,530 A | 3/1986 | Zeidler | 705/71 |
| 4,605,820 A | 8/1986 | Campbell, Jr. | 705/71 |
| 4,629,872 A | 12/1986 | Hällberg | 235/380 |
| 4,630,201 A | 12/1986 | White | 705/44 |
| 4,650,978 A | 3/1987 | Hudson et al. | 235/380 |
| 4,669,596 A | 6/1987 | Capers et al. | 194/210 |
| 4,705,211 A | 11/1987 | Honda et al. | 235/380 |
| 4,709,136 A | 11/1987 | Watanabe | 235/379 |
| 4,709,137 A | 11/1987 | Yoshida | 705/41 |
| 4,727,243 A | 2/1988 | Savar | 705/17 |
| 4,727,244 A | 2/1988 | Nakano et al. | 235/380 |
| 4,731,842 A | 3/1988 | Smith | 705/71 |
| 4,734,568 A | 3/1988 | Watanabe | 235/487 |
| 4,736,094 A | 4/1988 | Yoshida | 705/41 |
| 4,742,215 A | 5/1988 | Daughters et al. | 235/487 |
| 4,745,267 A | 5/1988 | Davis et al. | 235/379 |
| 4,746,788 A | 5/1988 | Kawana | 235/380 |
| 4,748,557 A | 5/1988 | Tamada et al. | 235/379 |
| 4,748,668 A | 5/1988 | Shamir et al. | 380/30 |
| 4,752,677 A | 6/1988 | Nakano et al. | 235/380 |
| 4,757,185 A | 7/1988 | Onishi | 235/379 |
| 4,757,543 A | 7/1988 | Tamada et al. | 380/51 |
| 4,759,063 A | 7/1988 | Chaum | 380/30 |
| 4,759,064 A | 7/1988 | Chaum | 380/30 |
| 4,767,920 A | 8/1988 | Kitta et al. | 235/492 |
| 4,778,983 A | 10/1988 | Ushikubo | 235/381 |
| 4,785,166 A | 11/1988 | Kushima | 235/441 |
| 4,786,790 A | 11/1988 | Kruse et al. | 235/380 |
| 4,797,542 A | 1/1989 | Hara | 235/380 |
| 4,797,920 A | 1/1989 | Stein | 705/72 |
| 4,798,941 A | 1/1989 | Watanabe | 235/380 |
| 4,802,218 A | 1/1989 | Wright et al. | 705/60 |
| 4,803,347 A | 2/1989 | Sugahara et al. | 235/379 |
| 4,811,393 A | 3/1989 | Hazard | 380/277 |
| 4,816,653 A | 3/1989 | Anderl et al. | 235/380 |
| 4,816,654 A | 3/1989 | Anderl et al. | 235/380 |
| 4,825,052 A | 4/1989 | Chemin et al. | 235/380 |
| 4,831,245 A | 5/1989 | Ogasawara | 235/492 |
| 4,833,595 A | 5/1989 | Iijima | 711/170 |
| 4,839,504 A | 6/1989 | Nakano | 235/379 |
| 4,839,792 A | 6/1989 | Iijima | 235/380 |
| 4,849,614 A | 7/1989 | Watanabe et al. | 235/379 |
| 4,853,522 A | 8/1989 | Ogasawara | 235/380 |
| 4,853,961 A | 8/1989 | Pastor | 713/176 |
| 4,874,935 A | 10/1989 | Younger | 235/492 |
| 4,877,945 A | 10/1989 | Fujisaki | 235/379 |
| 4,877,947 A | 10/1989 | Mori | 235/380 |
| 4,879,747 A | 11/1989 | Leighton et al. | 713/186 |
| 4,882,474 A | 11/1989 | Anderl et al. | 235/380 |
| 4,887,234 A | 12/1989 | Iijima | 711/173 |
| 4,891,503 A | 1/1990 | Jewell | 235/380 |
| 4,891,506 A | 1/1990 | Yoshimatsu | 235/492 |
| 4,900,904 A | 2/1990 | Wright et al. | 235/381 |
| 4,901,276 A | 2/1990 | Iijima | 710/33 |
| 4,906,828 A | 3/1990 | Halpern | 235/379 |
| 4,907,270 A | 3/1990 | Hazard | 713/181 |
| 4,926,480 A | 5/1990 | Chaum | 705/69 |
| 4,935,962 A | 6/1990 | Austin | 713/159 |
| 4,949,257 A | 8/1990 | Orbach | 705/21 |
| 4,961,142 A | 10/1990 | Elliott et al. | 705/73 |
| 4,969,188 A | 11/1990 | Schöbi | 380/277 |
| 4,977,595 A | 12/1990 | Ohta et al. | 705/69 |
| 4,984,270 A | 1/1991 | LaBounty | 705/72 |
| 4,985,615 A | 1/1991 | Iijima | 235/492 |
| 4,987,593 A | 1/1991 | Chaum | 705/69 |
| 4,993,068 A | 2/1991 | Piosenka et al. | 713/186 |
| 4,993,069 A * | 2/1991 | Matyas et al. | 380/280 |
| 4,995,081 A | 2/1991 | Leighton et al. | 713/186 |
| 4,996,711 A | 2/1991 | Chaum | 380/30 |
| 5,001,753 A | 3/1991 | Davio et al. | 380/29 |
| 5,003,594 A | 3/1991 | Shinagawa | 713/159 |
| 5,005,200 A | 4/1991 | Fischer | 380/30 |
| 5,010,239 A | 4/1991 | Mita | 235/441 |
| 5,012,074 A | 4/1991 | Masada | 235/379 |
| 5,012,076 A | 4/1991 | Yoshida | 235/379 |
| 5,014,312 A * | 5/1991 | Lisimaque et al. | 380/21 |
| 5,016,274 A | 5/1991 | Micali et al. | 705/66 |
| 5,038,025 A | 8/1991 | Kodera | 235/492 |
| 5,068,894 A | 11/1991 | Hoppe | 713/172 |
| 5,093,862 A | 3/1992 | Scwartz | 705/65 |
| 5,097,115 A | 3/1992 | Ogasawara et al. | 235/380 |
| 5,120,939 A | 6/1992 | Claus et al. | 235/382 |
| 5,128,997 A | 7/1992 | Pailles et al. | 705/66 |
| 5,131,038 A | 7/1992 | Puhl et al. | 340/5.61 |
| 5,142,578 A | 8/1992 | Matyas et al. | 380/280 |
| 5,146,499 A | 9/1992 | Geffrotin | 713/172 |
| 5,148,481 A | 9/1992 | Abraham et al. | 380/46 |
| 5,161,231 A | 11/1992 | Iijima | 710/15 |
| 5,162,989 A | 11/1992 | Matsuda | 705/1 |
| 5,163,098 A | 11/1992 | Dahbura | 705/75 |
| 5,164,988 A | 11/1992 | Matyas et al. | 713/156 |
| 5,165,043 A | 11/1992 | Miyahara et al. | 235/380 |
| 5,166,503 A | 11/1992 | Mizuta | 235/492 |
| 5,175,416 A | 12/1992 | Mansvelt et al. | 235/379 |
| 5,180,901 A | 1/1993 | Hiramatsu | 235/380 |
| 5,191,193 A | 3/1993 | Le Roux | 235/379 |
| 5,191,608 A | 3/1993 | Geronimi | 713/187 |
| 5,200,999 A | 4/1993 | Matyas et al. | 380/277 |
| 5,201,000 A | 4/1993 | Matyas et al. | 380/30 |
| 5,202,922 A | 4/1993 | Iijima | 380/45 |
| 5,214,702 A | 5/1993 | Fischer | 380/30 |
| 5,224,162 A | 6/1993 | Okamoto et al. | 705/69 |
| 5,243,175 A | 9/1993 | Kato | 235/435 |
| 5,247,578 A | 9/1993 | Pailles et al. | 705/65 |
| 5,293,577 A | 3/1994 | Hueske et al. | 705/65 |
| 5,319,705 A * | 6/1994 | Halter et al. | 705/54 |
| 5,371,797 A | 12/1994 | Bocinsky, Jr. | 705/70 |
| 5,420,405 A | 5/1995 | Chasek | 235/379 |
| 5,452,431 A | 9/1995 | Bournas | 711/115 |
| 5,473,690 A | 12/1995 | Grimonprez et al. | 705/66 |
| 5,485,520 A | 1/1996 | Chaum et al. | 705/74 |
| 5,511,121 A | 4/1996 | Yacobi | 705/69 |
| 5,517,011 A | 5/1996 | Vandenengel | 235/441 |
| 5,530,232 A | 6/1996 | Taylor | 235/380 |
| 5,534,857 A | 7/1996 | Laing et al. | 340/5.74 |
| 5,539,825 A | 7/1996 | Akiyama et al. | 705/68 |
| 5,542,081 A | 7/1996 | Geronimi | 712/37 |
| 5,544,246 A | 8/1996 | Mandelbaum et al. | 705/65 |
| 5,546,523 A | 8/1996 | Gatto | 345/811 |
| 5,557,516 A | 9/1996 | Hogan | 705/41 |
| 5,574,269 A | 11/1996 | Mori et al. | 235/380 |
| 5,578,808 A | 11/1996 | Taylor | 235/380 |
| 5,581,708 A | 12/1996 | Iijima | 710/11 |
| 5,588,146 A | 12/1996 | Leroux | 707/1 |
| 5,682,027 A | 10/1997 | Bertina et al. | 235/380 |
| 5,692,132 A | 11/1997 | Hogan | 705/27 |
| 5,699,528 A | 12/1997 | Hogan | 705/40 |
| 5,704,046 A | 12/1997 | Hogan | 705/39 |
| 5,705,798 A | 1/1998 | Tarbox | 235/379 |
| 5,708,780 A | 1/1998 | Levergood et al. | 709/229 |
| 5,715,314 A | 2/1998 | Payne et al. | 705/78 |
| 5,724,424 A | 3/1998 | Gifford | 705/79 |
| 5,796,831 A | 8/1998 | Paradinas et al. | 705/68 |
| 5,825,875 A | 10/1998 | Ugon | 705/65 |
| 6,202,150 B1 * | 3/2001 | Young et al. | 713/167 |
| 6,229,894 B1 * | 5/2001 | Van Oorschot et al. | 380/21 |
| 6,249,866 B1 * | 6/2001 | Brundrett et al. | 713/165 |
| 6,317,832 B1 * | 11/2001 | Everett et al. | 713/172 |

FOREIGN PATENT DOCUMENTS

| | | | |
|---|---|---|---|
| EP | 0547741 | 9/1992 | |
| EP | 0537756 | 4/1993 | |
| EP | 0540095 | 5/1993 | |
| EP | 0559205 | 8/1993 | |
| EP | 0588339 | 3/1994 | |
| EP | 0594493 | 4/1994 | |
| EP | 0636998 | 2/1995 | G06K/19/073 |
| EP | 0686947 | 2/1995 | |
| EP | 0647902 | 4/1995 | |
| EP | 0666550 | 8/1995 | |
| EP | 0707290 | 9/1995 | |
| EP | 0751460 | 1/1997 | |
| FR | 2536928 | 6/1984 | |
| FR | 2687816 | 8/1993 | G06K/17/00 |
| FR | 2667171 | 3/1997 | G06F/9/06 |
| GB | 2284689 | 6/1995 | G06F/9/24 |
| JP | 6481084 | 3/1989 | G06K/17/00 |
| JP | 2592856 | 12/1996 | |
| JP | 2592856 | 3/1997 | G06K/17/00 |
| WO | WO 8707062 | 11/1987 | |
| WO | WO 8809019 | 11/1988 | |
| WO | WO 9005960 | 5/1990 | G06K/7/003 |
| WO | WO 9116691 | 10/1991 | |
| WO | WO 9213322 | 9/1992 | G06K/19/073 |
| WO | WO 9320538 | 10/1993 | |
| WO | WO 9321612 | 10/1993 | G07F/17/16 |
| WO | WO 9522810 | 8/1995 | |
| WO | WO 9619771 | 6/1996 | G06F/12/00 |
| WO | WO 9628795 | 9/1996 | |
| WO | WO 9638825 | 12/1996 | G06K/19/073 |
| WO | WO 9843212 | 10/1998 | G07F/7/10 |
| WO | WO 9101538 | 2/1999 | |
| WO | WO 9910824 | 3/1999 | G06F/17/60 |
| WO | WO 9916031 | 4/1999 | G07F/7/10 |

\* cited by examiner

ACCESS FLAGS

SYSTEM AND METHOD FOR CONTROLLING ACCESS TO COMPUTER CODE IN AN IC CARD

PRIORITY APPLICATION

This application claims priority to U.S. Provisional Application Serial No. 60/073,566 filed on Feb. 3, 1998, entitled "Access/Crypto Flags".

RELATED APPLICATIONS

This application is related to U.S. Provisional Application Serial No. 60/072,561 filed on Jan. 22, 1998 entitled "Codelets" and U.S. patent application Ser. No. 09/076,551 filed on May 12, 1998 entitled "Secure Multiple Application Card System and Process," now U.S. Pat. No. 6,317,183 which are hereby incorporated by reference.

BACKGROUND OF INVENTION

Integrated circuit cards are becoming increasingly used for many different purposes in the world today. An IC card typically is the size of a conventional credit card on which a computer chip is embedded. It comprises a microprocessor, read-only-memory (ROM), electrically erasable programmable read-only-memory (EEPROM), an Input/Output (I/O) mechanism and other circuitry to support the microprocessor in its operations. An IC card may contain one or more applications in memory. An application loader is the entity which loads the application on the card. The application loader may be the actual developer of the application or may be a third party.

MULTOS™ is a multiple application operating system which runs on IC cards, among other platforms, and allows multiple applications to be executed on the card itself. This allows a card user to run many programs stored in the card (for example, credit/debit, electronic money/purse and/or loyalty applications) irrespective of the type of terminal (i.e., ATM, telephone and/or POS) in which the card is inserted for use. Of utmost importance in using such a card is security, and the operator of a card system enables cards to securely communicate with terminals or other cards. The operator also manages application loading and deleting from cards and the cryptographic keys which make the system secure.

IC cards typically have limited storage capacity due to the size and cost restraints of locating memory on the card. Applications for multi-application smart cards are written in a programming language and are typically stored in the EEPROM whose contents can be changed during the lifetime of the card. One example of a programming language used in IC cards is Multos Executable Language (MEL™). The MEL program instructions are read from EEPROM when they are executed and are interpreted by the operating system stored in ROM.

The ROM on the IC card includes the operating system written in assembler language code for the particular integrated circuit configuration (native language type code). The operating code stored in ROM is fixed when the ROM is initially written and the information stored in ROM will not change for the life of the card.

Also present in ROM can be subroutines called primitives written in a native language code for the microprocessor which can be called by either the operating system itself or by applications when they are executed. Primitives are written in the native language (i.e. assembler language) so that they can be executed very quicky and minimal interpretation of the instructions is necessary for execution. These primitives are collections of instructions which typically perform a desired function, such as a mathematical or cryptographic function. The instructions are never changed during the lifetime of the card. Any data used or accessed by the primitives are stored in EEPROM so that the contents of the data elements can change as necessary.

In the MULTOS™ system, applications can call primitives stored on the card which then are executed by the operating system. For example, if an application needs to divide two numbers, the application can call the "divide" primitive and provide the operands for the function and the primitive will execute the calculation. Every application on the card has the ability to call the divide primitive by executing an "access divide primitive" instruction. While some primitives are necessary to almost all applications, such as basic mathematical formulas or basic data retrievals, some primitives are optional and are intended to be used by only some applications. For example, security related primitives which encrypt/decrypt data may be used by some applications (e.g., a bank application) but not others (e.g., an air miles or entertainment application) due to the needs of the individual application.

Additionally, external considerations may impact the permitted use of some primitives by an application. These considerations would require the operator of the card system to have control over (i.e., prevent) access to certain primitives by individual applications. One such consideration is an individual country's concerns about strong encryption algorithms for certain types of applications being used in the country and being exported from the country. For example, the United Kingdom may allow an encryption algorithm which is part of a primitive to be exported out of the country if the algorithm is used for a banking function. However, if the encryption algorithm is used on general data such as health information, the United Kingdom's public policy may dictate that the encryption algorithm cannot be used outside its borders. Thus, it would be advantageous to disable the encryption primitive for that application if a country's laws prohibit that type of data being encrypted and exported. This selective enabling of primitives for individual applications would be a powerful mechanism to control the card system.

There are other reasons to provide selective access to different primitives. Specifically, it would be desirable to have an access check for different primitives to selectively enable primitives depending upon the needs of the card system operation and/or of the providers of the applications which run on the system. For example, an I/O port "access flag" could be checked when a selected primitive is called. Most IC cards currently can exchange information with a terminal by physically connecting an I/O port on the card with the terminal. The contacts located on the card are physically pressed against the terminal contacts so that an electrical signal can pass between the card and terminal. Recent developments allow an IC card to communicate with a terminal without establishing a physical contact between the card and the terminal. The exchange of information is established by radio frequency (RF) waves, cellular signals or other transmitted signal. For contactless cards an antenna is present on the card to transmit and receive the transmission signals. IC cards can contain both the physical contacts and the antennas for wireless communication. Although transferring information in a contactless or wireless manner is advantageous to the card holder by expediting the overall transaction time, the transmission signals are more susceptible to interception by a third party than if a physical connection were made. As a result, the operator of the card system may want to limit particular application programs such as financial transactions to physical connections.

Therefore, it is an object of the invention to provide a multi-application card with the ability to control access to the primitives and to allow the card system operator to enable or disable or prevent access to a primitive for a particular application.

SUMMARY OF THE INVENTION

The applicants have thus invented a system and method for controlling access to computer code and specifically to primitives embedded on a multi-application IC card. The applicants have determined that one way to achieve this objective is by use of "access flags," which, as explained in more detail below, are set in bits for indicating either that a primitive (e.g., an encryption primitive) is accessible to a particular application (if, for example, the bit is set at 1) or it is not (if the bit=0). In the case of an encryption-related primitive, the "access flag" may be referred to as a "crypto flag."

Access flags related to I/O could also be used to prevent access to the contactless primitives for financial applications. The I/O access flags would be controlled and set by the card system operator and loaded onto the card by the application loader at the time the application is loaded onto the card. This access flag would allow the operator of the card system to prevent a financial or other selected application from using the contactless primitive and thus a physical connection would be required for terminal communication.

Access flags which are stored on the card and checked by the operating system allow the operator of the card system to control access to selective primitives or other subroutines by checking the status of the access flag prior to executing the primitive or subroutine. Other subroutines such as codelets (subroutines written in an application language such as MEL), subroutines in the operating system itself or other types of subroutines could also have associated access flags. The checking of the access flag is preferably performed by the operating system when a specific subroutine call instruction is executed by an application or other instruction. Depending upon the results of the access flag check, the application either executes the primitive or subroutine in question or performs another series of instructions if access is denied.

The access flags are stored with application control data which is stored in EEPROM when the application is loaded onto the card. Preferably, the flag's default setting is to "not enabled" prior to loading but the operator of the card system can set the flag to a logic "1" to indicate "enabled" if desired. For example, if an application is programmed to call a strong encryption subroutine in Country B which is outside of Country A where the algorithm was developed, the application provider might be required by the card system operator to show a certificate from the country where the card will be used showing that the application provider received permission from the government of Country A (export license) and Country B (use license) to use the encryption primitive. Upon showing of the certificate, the card operator enables the access flag bit. In this case, the "access flag" could be termed a "crypto flag" because it relates to encryption.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
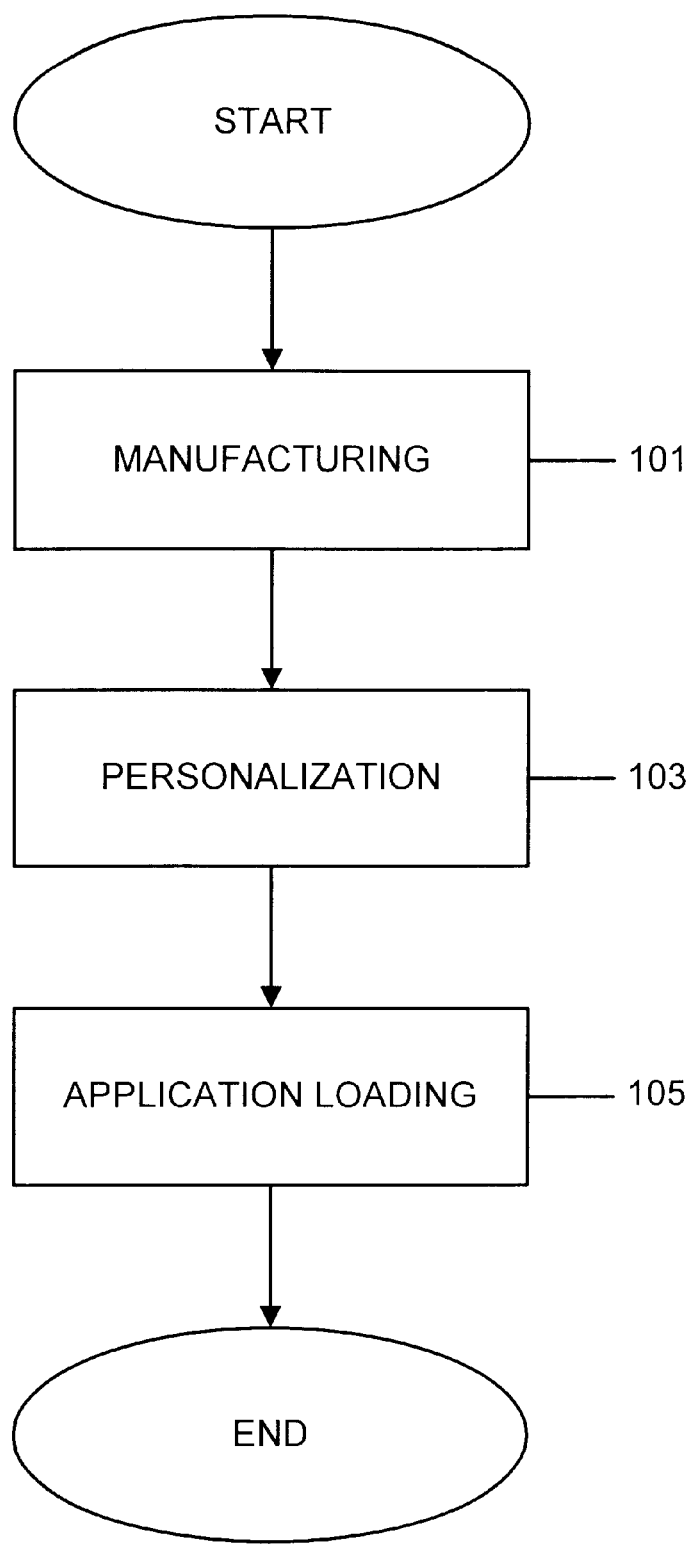
FIG. 1 is a block diagram illustrating the three states in the life of a multi-application IC card in a secure system.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENT

FIG. 1 shows the three steps involved in providing an operational multi-application IC card in a secure system. The first step is the card manufacturing step 101. The second step is the personalization step 103 where card personalization data (also called entity authentication data) is loaded onto the card. The third step is the application loading step 105 which checks to see if a card is qualified to receive an application, i.e., when the personalization data is checked against the application permissions data associated with the application to be loaded. Each of these three steps is described in detail in co-pending application Ser. No. U.S. Pat. No. 09/076,551 now U.S. Pat. No. 6,317,832 incorporated herein by reference.

Figure 2:
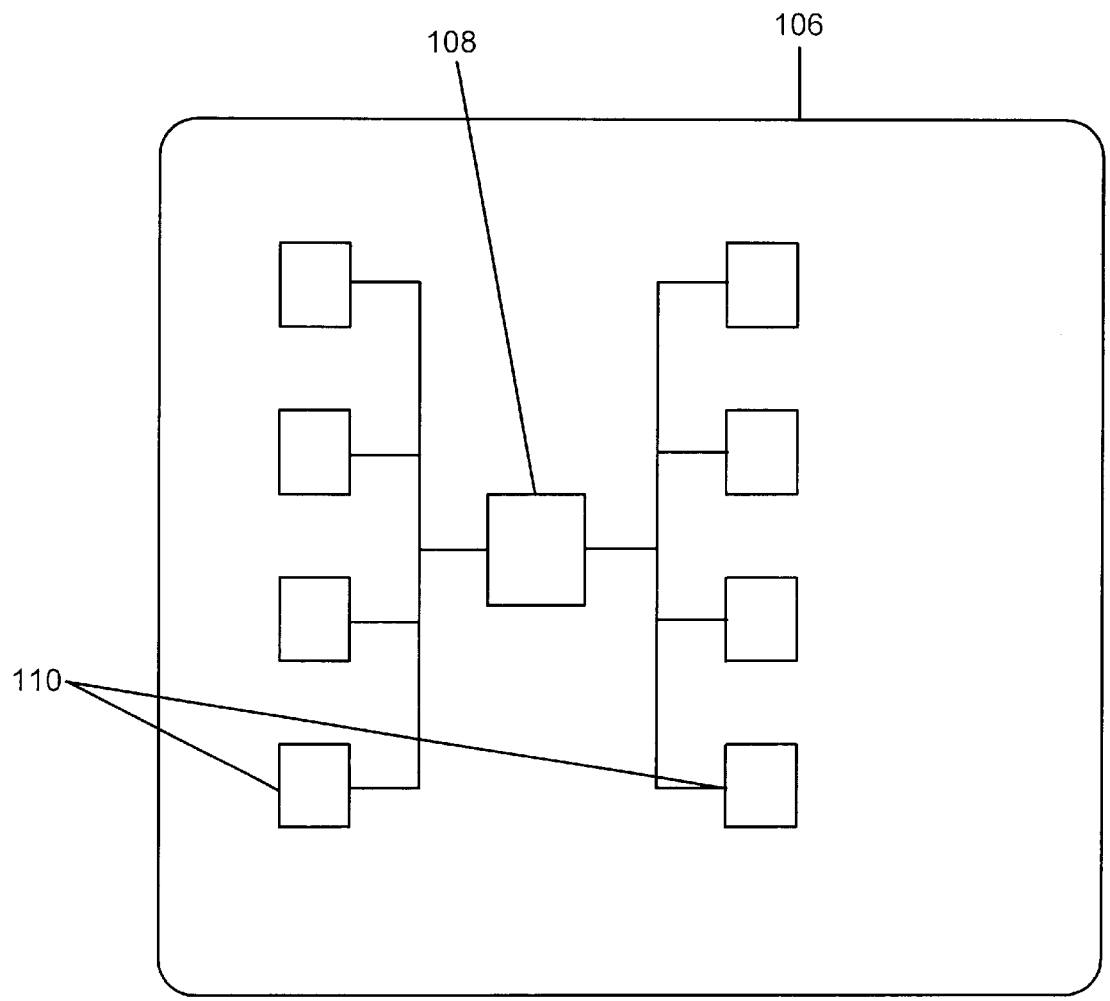
FIG. 2 illustrates an integrated circuit card which can be used in connection with this invention.

FIG. 2 illustrates a card 106 incorporating integrated circuit technology that can be used with the presently claimed invention. Card 106 looks similar to a conventional credit card, but also includes integrated circuit (IC) 108, which contains a microprocessor, and electrical contacts 110 for communication between IC 108 and devices external to card 106. Card 106 can be used for example, as a credit card, a debit card, and or as an electronic cash card, i.e., a card containing monetary value that can be transferred when the cardholder makes purchases, for example, a MONDEX™ cash card.

Figure 3:
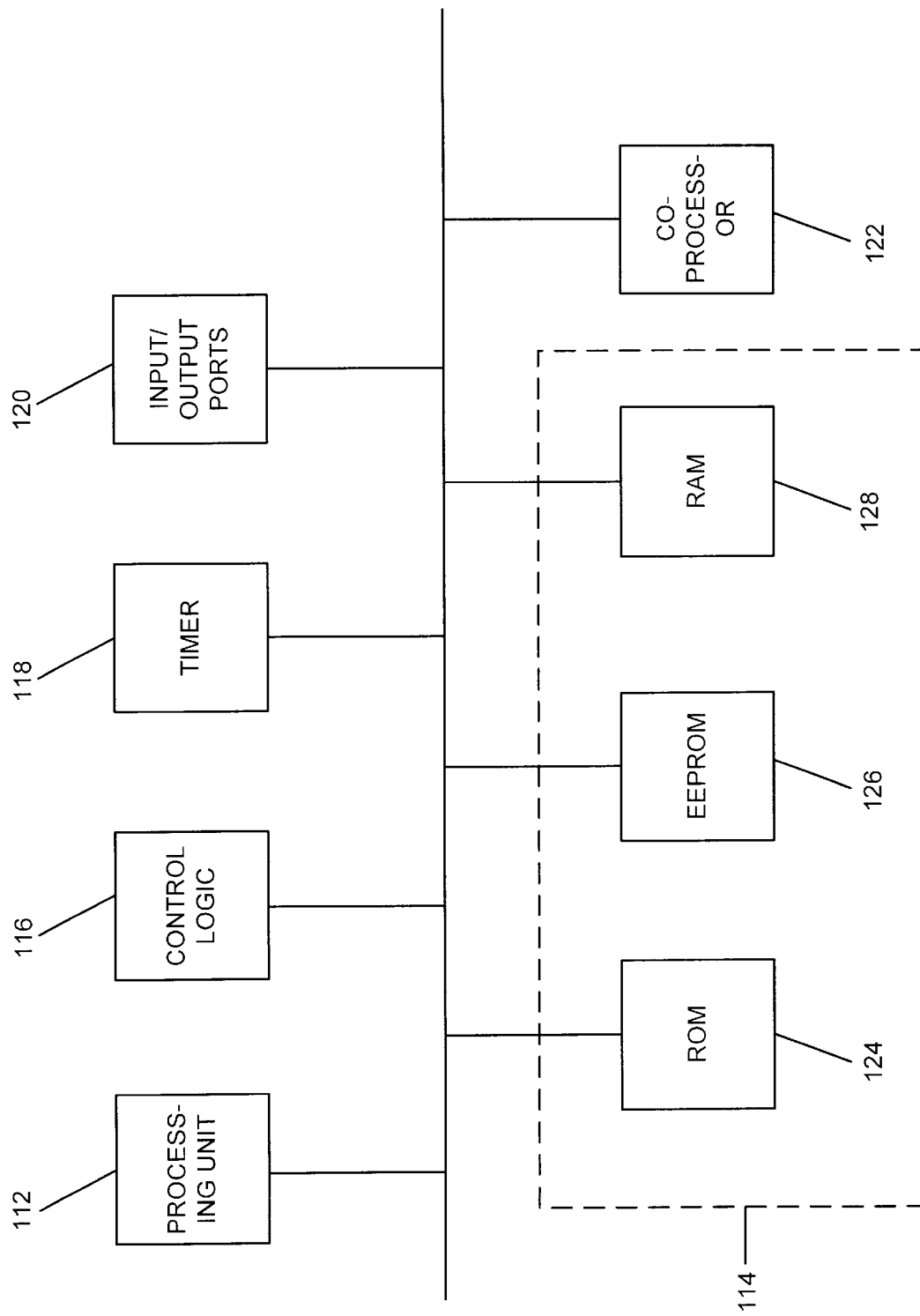
FIG. 3 is a functional block diagram of the integrated circuit shown in FIG. 2.

FIG. 3 is a functional block diagram of the IC section 108 and contains at least processing unit 112 and memory unit 114. Preferably, IC 108 also includes control logic 116, a timer 118, and input/output ports 120. IC section 108 can also include a co-processor 122. Control logic 116 provides, in conjunction with processing unit 112, the control necessary to handle communications between memory unit 114 (having ROM 124, EEPROM 126, and RAM 128 and input/output ports 120). Timer 118 provides a timing reference signal for processing unit 112 and control logic 116. Co-processor 122 provides the ability to perform complex computations in real time, such as those required by cryptographic algorithms.

Figure 4:
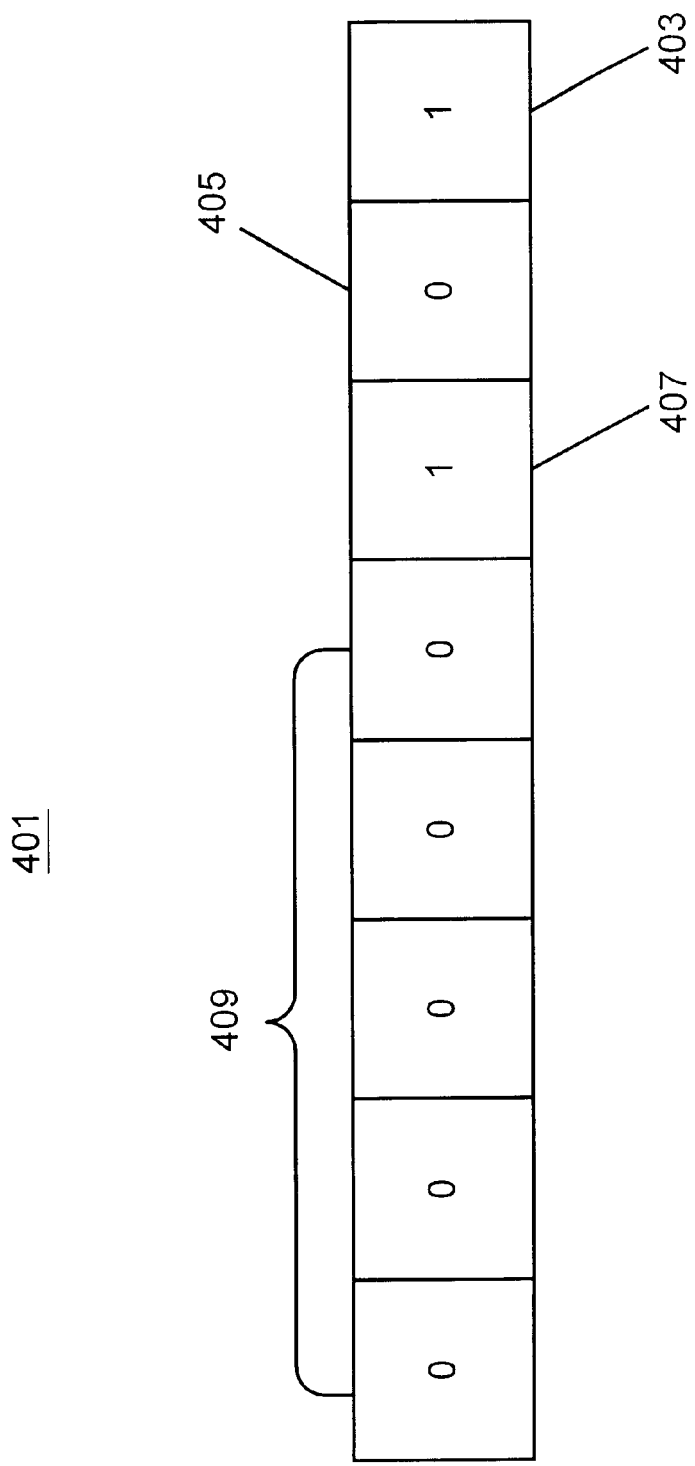
FIG. 4 is a bit map of an application control data structure in accordance with the present invention.

FIG. 4 shows an example of an application control data structure 401 sometimes called a bit-map preferably residing in EEPROM and containing multiple access flags for a particular application which was loaded onto an IC card. The bit-map preferably resides in EEPROM with the application, although it could reside in ROM if the access flags were determined before the time the data was written to ROM. Data 401 shows 8 bits (one byte) of data which is stored in the memory of the card. The length of the bit map can be variable with the length of available bits, depending upon the particular application and the system upon which it runs. In the present example, bit 403 corresponds to a crypto flag associated with an encryption primitive which was described above. The crypto flag bit is set to "1" if the encryption primitive is enabled for the particular application and is set to "0" if the primitive is not enabled. The default state in the preferred embodiment is always "0" to not enabled. This ensures that permission to execute a selected primitive is not given unless it is explicitly set by the operator of the card system when the application is loaded. However, in other systems the default could be "1" or enabled unless the operator of the card system explicitly disables the card.

The contactless I/O access flag bit, also described above, is shown as bit 405. This bit is checked when the contactless operation (for example, a primitive) is invoked by an application. The contactless operation may be, for example, all of the instructions required to transmit and receive wireless signals or may be a required portion of those instructions. If the contactless bit 405 is set to "1" then the operation can be executed and if the contactless bit 405 is set to "0" then the contactless operation cannot be executed.

Other different I/O ports can also have an access flag. The contactless access flag can also have additional flags for more refined control, an RF signal access flag and a cellular access signal. For example, another access flag bit shown in FIG. 4 is Application Program Interface (API) bit 407. This bit can control whether an application can be run by a specific API stored on the card. For instance, a card may contain a MEL API and a second operating system API. The API bit may restrict applications to using the MEL API or may enable the card to use the second operator system API. The use of the second operating system API by the particular application may require an issued license from the owner of the second operating system and the API flag can restrict the card from using the second API unless a license is obtained. Other access flag bits 409 can be defined by the system operator.

Although FIG. 4 shows multiple access flags, the presence of at least one access flag is advantageous and the total number of access flags can be tailored to the system or user. In addition, although a crypto flag is an important feature for the IC card which is an embodiment of the invention, a crypto flag is not required to be one of the access flags. The determination of what each access flag controls is directed by the system operator. While FIG. 4 shows a preferred bit representation of one bit for each access flag, the data organization can be different such as using the access list as an index register to point to the correct flag data.

Each application has its own associated bit-map list data as described in FIG. 4. The bit-map data containing the access flags is loaded onto the card with other application load information during the application load process. A field which specifies the length of the bitmap can precede the access list to facilitate a variable length access list. Once the values on the bit-map are set, they are not changed in order to minimize any illicit tampering with the flag data.

Described below is a description of how the operating system checks if an access flag bit is set when an application attempts to call a primitive with an associated access flag. In this example, if the associated flag is set to "0" and the primitive is called, the execution will abnormally end (abend). The example illustrates the use of a crypto flag in particular.

The requirement is for a mechanism, in the form of a bitmap, that will allow the grant or restriction of access to the cryptographic primitives offered by a MULTOS™ implementation to an application. Access to the "restricted access" MULTOS™ cryptographic primitives will be given only to those developers who provide documentation indicating that they have obtained the permission of the appropriate government authorities to access these cryptographic primitives.

Interaction between the card with a card issuer (who typically is the entity that asks for an application to be loaded) in a multiple application card system is through the provision of an Application Load Certificate ("ALC") (described in co-pending Ser. No. 09/076,551, which is incorporated herein by reference) which is supplied to the card during the personalization process described with respect to FIG. 1. The Application Load Certificate can contain access flag data for a particular application which associates a bitmap (or a flag) with an application in an integrity protected manner.

In the ALC, a data element preferably labeled "access-list" is used to indicate whether or not access to a particular primitive is available. More specifically, a single bit is preferably used to indicate the "access-list" flag stored on the IC card, although other data configurations can be used. Thus, if an application attempts to access a restricted (unavailable) cryptographic primitive (e.g. "access-list" value for that primitive with respect to the executive application equals 0), then the process will abend. If the process abends, execution of the application program currently running can be halted and an error message can be sent to a display terminal if connected to the IC card. Otherwise, access will be granted, the primitive's set of programming instructions will be executed, and then the application will continue with the execution of its instructions.

Figure 5:
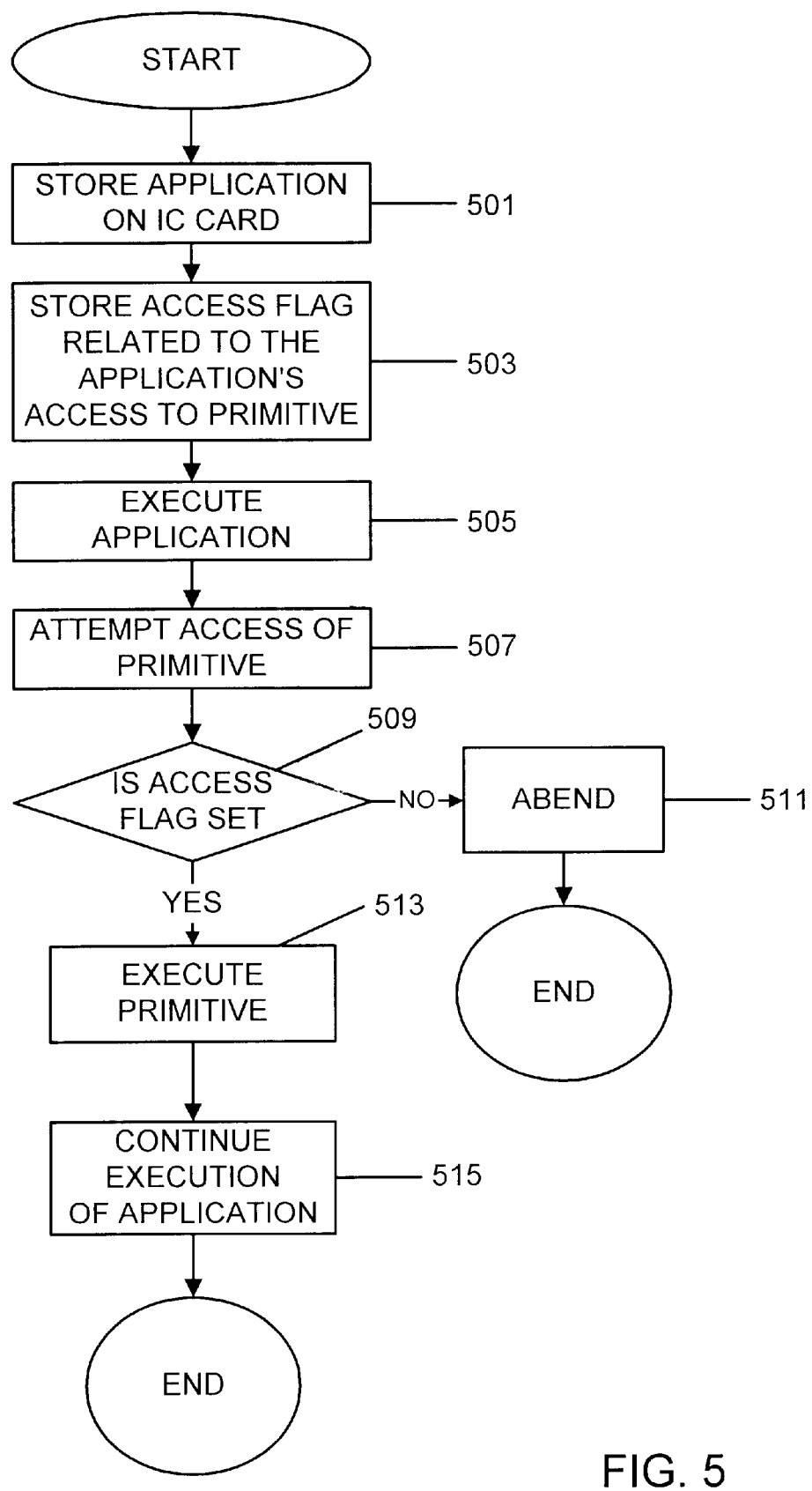
FIG. 5 is a flow chart of a method for controlling access to computer code.

FIG. 5 shows a flow chart of the steps for implementing a method of controlling access to computer code in an IC card. Step 501 stores an application on an IC card. The application can be stored on the card at the time of manufacture or preferably at a personalization process as described in FIG. 1. The IC card includes a multiple application operating system which allows the microprocessor on the card to execute multiple applications stored on the card.

Step 503 stores an access flag related to a primitive, or some other set of programming instructions, for one or more applications stored on the IC card. The access flag can be stored prior to the application being loaded, concurrently with the application being loaded or after the application has been loaded. In order for maximum security, the access flag is stored in read-only-memory at the time of manufacture and cannot be altered. Alternatively, the access flag can be stored in programmable memory which can be altered to personalize the card with respect to the individual applications loaded on the IC card and in order to have the ability to remove the access flags when and if an application is deleted from the card. For example, with respect to a cryptographic access flag, an application provider may receive permission for the exporting and importing of certain cryptography stored as a primitive after an application has been loaded onto the card. In that case, the access flag may be changed if the memory which stores the access flag is alterable.

Step 505 executes one of the application programs stored on the card (e.g., a credit/debit application). If the program instructions in the executed application require that a primitive be accessed in step 507, the operating system resident on the IC card will first check the access flag associated with the particular primitive or function. Each primitive can have different access flags for each application or group of applications so that one application may be allowed access and a second application may not. The access flags give the manager of the multiple application card system important control over access to selected primitives.

Step 509 checks the condition of the appropriate access flag in step 509. If the access flag indicates that access is denied (e.g., the value of the access flag is zero), then the executing application abnormally ends (abends) in step 511. An error message can be displayed to the card user giving the reason for the abend. Alternatively, the application through its programming instructions can be programmed for either a positive or negative access flag check and execute selected portions of the application in response to the value of the access flag.

If the access flag is set to a positive value (e.g., "1"), the primitive which has been accessed is executed in step 513. After the program instructions of the primitive have been executed, the process continues with step 515. Step 515 then continues the execution of the application which is currently being executed by the microprocessor on the IC card.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

We claim:

1. In a multiple application card system including an integrated circuit card comprising a microprocessor, a read-only memory, a random access memory and an electrically erasable programmable read only memory, a system for controlling access to at least one set of programming instructions stored at a first time in said read-only memory comprising:

means for storing on said IC card at a second time, for at least one application loaded onto said card, at least one access flag having a value indicating whether or not said at least one application shall be allowed to execute said at least one set of programming instructions, said second time being after said first time; and means dependent on said value for allowing said at least one application to execute said at least one set of programming instructions, wherein said value of said at least one access flag comprises one of a first possible access flag value and a second possible access flag value, said means dependent on said value allowing said at least one application to execute said at least one set of programming instructions if said value of said at least one access flag comprises said first possible access flag value, and said means dependent on said value not allowing said at least one application to execute said at least one set of programming instructions if said value of said at least one access flag comprises said second possible access flag value;

wherein execution of said cryptographic primitive is denied when the value of said at least one access flag is set to 0 and is granted when the value of said at least one access flag is set to 1.

2. An integrated circuit card comprising:

a microprocessor;

at least one memory coupled to said microprocessor for storing at least one application program, said at least one memory further for storing one or more sets of programming instructions at a first time and at least one access flag at a second time, said second time being after said first time, said at least one access flag being associated with said one or more sets of programming instructions; and a multiple application operating system stored on said integrated circuit card and executed by said microprocessor which enables execution of said one or more sets of programming instructions responsive to a value of said at least one access flag, wherein said value of said at least one access flag comprises one of a first possible access flag value and a second possible access flag value, said multiple application operating system enabling execution of said one or more sets of programming instructions if said value of said at least one access flag comprises said first possible access flag value, and said multiple application operating system disabling execution of said one or more sets of programming instructions if said value of said at least one access flag comprises said second possible access flag value;

wherein at least one set of said one or more sets of programming instructions comprises a cryptographic primitive, and wherein execution of said cryptographic primitive is denied when the value of said at least one access flag is set to 0 and is granted when the value of said at least one access flag is set to 1.

3. In a multiple application card system including an integrated circuit card comprising a microprocessor, a read-only memory, a random access memory and an electrically erasable programmable read only memory, a method for controlling access to at least one set of programming instructions stored at a first time in said read-only memory comprising:

storing on said IC card at a second time, for at least one application loaded onto said card, at least one access flag having a value indicating whether or not said at least one application shall be allowed to execute said at least one set of programming instructions, said second time being after said first time; and depending on said value, allowing said at least one application to execute said at least one set of programming instructions, wherein said value of said at least one access flag comprises one of a first possible access flag value and a second possible access flag value, said step depending on said value comprising: (a) allowing said at least one application to execute said at least one set of programming instructions if said value of said at least one access flag comprises said first possible access flag value, and (b) not allowing said at least one application to execute said at least one set of programming instructions if said value of said at least one access flag comprises said second possible access flag value; wherein said at least one set of programming instructions comprises a cryptographic primitive and wherein execution of said cryptographic primitive is denied when the value of said at least one access flag is set to 0 and is granted when the value of said at least one access flag is set to 1.

4. A multiple application card system including an integrated circuit card comprising a microprocessor, a read-only memory, a random access memory, an electronically erasable programmable read-only memory, and at least one set of programming instructions stored in said read-only memory comprising:

means for storing on said integrated circuit card at least one application capable of accessing said at least one set of programming instructions;

means for storing, for said at least one application, application control data particular to each said at least one application and having at least one access flag indicating whether access by said application to said set of programming instructions for execution is allowable; and means dependent on said access flag for allowing access to said at least one set of programming instructions by said application;

wherein said means for storing application control data resides in said electronically erasable programmable read-only memory, at least one set of programming instructions is a cryptographic primitive, and access to said cryptographic primitives is denied when the value of said access flag is set to 0 and is granted when set to 1.

5. An integrated circuit card comprising:

a microprocessor;

at least one memory coupled to said microprocessor for storing at least one application capable of accessing at least one set of programming instructions based upon application control data particular to each said application, said data having at least one access flag associated with said at least one set of program instructions, said flag having a first value indicative of allowing said access and a second value indicative of denying said access; and a multiple application operating system stored on said integrated circuit card and executed by said microprocessor which, responsive to said first value, enables access by said application to said at least one set of program instructions;

wherein said at least one set of programming instructions is a cryptographic primitive, and wherein access to said cryptographic primitives is denied when the value of said at least one access flag is set to 0 and is granted when set to 1.

6. In a multiple-application card system including an integrated circuit card comprising a microprocessor, a read-only memory, a random access memory and an electronically erasable programmable read-only memory, a method for controlling access to at least one set of programming instructions stored in said read-only memory comprising:

storing at least one application on said IC card which application is capable of accessing said at least one set of programming instructions;

storing on said IC card application control data particular to each said application and including at least one access flag, said application control data for controlling access to said at least one set of programming instructions;

depending on the at least one stored application, setting a value to said at least one access flag to either enable or deny access by said application to the at least one set of programming instructions; and allowing access to at least one set of programming instructions in the event said access flag is set to enable access;

wherein at least one set of programming instructions is a cryptographic primitive, and wherein access to said cryptographic primitives is denied when the value of said access flag is set to 0 and is granted when set to 1.

\* \* \* \* \*